(12) United States Patent
An et al.

(10) Patent No.: US 10,976,844 B2
(45) Date of Patent: Apr. 13, 2021

(54) TOUCH SENSOR AND MANUFACTURING METHOD THEREOF

(71) Applicant: DONGWOO FINE-CHEM CO., LTD., Jeollabuk-do (KR)

(72) Inventors: Myung Young An, Incheon (KR); Dong Jin Son, Chungcheongnam-do (KR)

(73) Assignee: DONGWOO FINE-CHEM. CO, LTD., Jeollabuk-do (KR)

( * ) Notice: Subject to any disclaimer, the term of this patent is extended or adjusted under 35 U.S.C. 154(b) by 0 days.

(21) Appl. No.: 16/136,973

(22) Filed: Sep. 20, 2018

(65) Prior Publication Data

US 2019/0095021 A1    Mar. 28, 2019

(30) Foreign Application Priority Data

Sep. 27, 2017 (KR) .......................... 10-2017-0124884

(51) Int. Cl.
*G06F 3/041* (2006.01)
*G02B 5/30* (2006.01)

(52) U.S. Cl.
CPC .......... *G06F 3/0412* (2013.01); *G02B 5/3033* (2013.01); *G06F 3/041* (2013.01); *G06F 2203/04103* (2013.01)

(58) Field of Classification Search
CPC ...... G06F 3/0412; G06F 3/041; G02B 5/3033
USPC ........................................ 345/173; 156/275.5
See application file for complete search history.

(56) References Cited

U.S. PATENT DOCUMENTS

| 3,707,371 A | * | 12/1972 | Files | ................... | G03H 1/0248 |
| | | | | | 430/270.1 |
| 5,614,576 A | * | 3/1997 | Rutherford | ............ | C09J 167/04 |
| | | | | | 522/6 |
| 5,753,364 A | * | 5/1998 | Rutherford | ............ | C09J 167/04 |
| | | | | | 156/332 |

(Continued)

FOREIGN PATENT DOCUMENTS

| JP | 02000249822 A | * | 9/2000 | ................ | C08F 2/44 |
| JP | 02002030105 A | * | 1/2002 | ................ | C08F 2/50 |

(Continued)

OTHER PUBLICATIONS

Notification of Grounds for Rejection from counterpart Korean Appln. No. 10-2017-0124884 dated Apr. 17, 2019, and its English translation.

*Primary Examiner* — Prabodh M Dharia
(74) *Attorney, Agent, or Firm* — DLA Piper LLP (US)

(57) ABSTRACT

Provided herein is a touch sensor including: a substrate having a transmittance of 5% or less at a wavelength of 380 nm; a touch sensor layer configured to be opposite the substrate and having a thickness of 2 μm to 10 μm; and an adhesive layer disposed between the substrate and the touch sensor layer, wherein the adhesive layer includes a cured product of an adhesive composition including at least one selected from the group consisting of an initiator and a sensitizer having an absorption wavelength in the range of 380 nm to 450 nm and has an adhesion strength of 5 N/25 trim or more. There is an advantageous effect in that the provided film-type touch sensor represents excellent adhesion and folding characteristics even when the substrate has a relative low transmittance.

10 Claims, 1 Drawing Sheet

(56) References Cited

U.S. PATENT DOCUMENTS

| | | | | |
|---|---|---|---|---|
| 5,807,659 | A * | 9/1998 | Nishimiya | B41N 3/08 |
| | | | | 101/456 |
| 7,365,900 | B2 * | 4/2008 | Yamamoto | G02F 1/167 |
| | | | | 345/107 |
| 2002/0017612 | A1 * | 2/2002 | Yu | B82Y 10/00 |
| | | | | 250/370.11 |
| 2006/0077868 | A1 * | 4/2006 | Ishibashi | G11B 7/246 |
| | | | | 369/272.1 |
| 2007/0148556 | A1 * | 6/2007 | Maeno | G03F 7/001 |
| | | | | 430/1 |
| 2011/0104483 | A1 * | 5/2011 | Shinozaki | C09J 7/22 |
| | | | | 428/347 |
| 2012/0105965 | A1 * | 5/2012 | Koyama | G02B 5/282 |
| | | | | 359/588 |
| 2014/0116615 | A1 * | 5/2014 | Ogawa | B32B 37/12 |
| | | | | 156/275.5 |
| 2014/0186766 | A1 * | 7/2014 | Higuchi | C08G 59/1466 |
| | | | | 430/280.1 |
| 2016/0324016 | A1 * | 11/2016 | Bellman | C03C 17/3417 |
| 2017/0160835 | A1 * | 6/2017 | Zenker | G06F 3/044 |
| 2017/0351362 | A1 * | 12/2017 | Nukui | G06F 3/044 |
| 2018/0134930 | A1 * | 5/2018 | An | C09J 9/00 |
| 2019/0034006 | A1 * | 1/2019 | Kim | B32B 27/36 |

FOREIGN PATENT DOCUMENTS

| | | | | |
|---|---|---|---|---|
| JP | 02010018797 A * | 1/2010 | | C08G 59/68 |
| JP | 2014157068 A | 8/2014 | | |
| KR | 20010006704 A * | 1/2001 | | C08F 2/50 |
| KR | 10-2015-0099459 | 8/2015 | | |
| KR | 20170020346 A | 2/2017 | | |
| KR | 20170083286 A | 7/2017 | | |

* cited by examiner

TOUCH SENSOR AND MANUFACTURING METHOD THEREOF

CROSS-REFERENCE TO RELATED PATENT APPLICATION

This U.S. non-provisional patent application claims priority under 35 U.S.C. § 119 of Korean Patent Application No. 10-2017-0124884 filed on Sep. 27, 2017 in the Korean Patent Office, the entire contents of which are hereby incorporated by reference.

BACKGROUND

Technical Field

The present invention relates to a touch sensor and a manufacturing method thereof.

Description of the Related Art

As a touch input method has been popularized as a next generation input method, attempts have been made to introduce the touch input method to a variety of electronic devices. Accordingly, research and development on a touch sensor which can be applied to various environments and can accurately recognize touch is actively performed.

For example, in the case of an electronic device having a touch-type display, an ultra-thin flexible display having an ultra-light weight, low power consumption, and improved portability has been spotlighted as a next generation display, and thus the development of a touch sensor applicable to such a display has been required.

According to the related art, in order to bond a touch sensor layer to another substrate, a touch sensor is laminated on the substrate using a transparent pressure-sensitive adhesive or the like. However, the transparent pressure-sensitive adhesive is not suitable for an ultra-thin film because the transparent pressure-sensitive adhesive causes bonding particles, air bubbles, and weak adhesion, and thus the transparent pressure-sensitive adhesive is not suitable for an ultra-thin flexible display.

Due to the disadvantages of the transparent pressure-sensitive adhesive, recently, a technique has been developed in which a UV-transparent substrate such as a COP (cyclo olefin polymer) film or a Zero TAC (triacetylcellulose) film is combined with a touch sensor using a UV adhesive in an image display device. A composite substrate such as a substrate including a coating layer having a UV cutting function or a polarizing plate is referred to as a UV poorly-permeating substrate since UV transmittance is low, and when the conventional adhesive is used to bond the UV poorly-permeating substrate with a touch sensor layer, an adhesion strength is lowered, and thus an image display device having excellent durability cannot be obtained.

Korean Unexamined Patent Publication No. 2015-0099459 discloses a polarizing plate, a touch panel including the same, and a display device, and more particularly, a polarizing plate integrally formed with a polarizer and a high-hardness plastic film, in which the high-hardness plastic film is an inorganic monolayer.

However, when a UV-curable adhesive is used instead of a pressure-sensitive adhesive in the display device of the above document, an adhesion strength between the polarizing plate and the touch sensor layer may be lowered. In addition, when the pressure-sensitive adhesive is used, the overall thickness of the display may increase and cracks may be generated upon folding due to a low modulus.

Therefore, it is required that a touch sensor representing an excellent adhesion strength between a UV poorly-permeating substrate and a touch sensor be developed, in particular, a touch sensor representing the excellent adhesion strength between a polarizing plate having low transmittance and the touch sensor and having improved folding characteristics.

PRIOR-ART DOCUMENTS

Patent Documents

Korean Unexamined Patent Publication No. 2015-0099459 (Aug. 31, 2015)

SUMMARY

1. Technical Problem

A technical objective of the present invention is to provide a touch sensor representing an excellent adhesion strength between a touch sensor layer and a substrate even when the touch sensor includes a UV poorly-permeating substrate.

Another technical objective of the present invention is to provide a touch sensor having a small thickness and an improved folding characteristic.

Yet another technical objective of the present invention is to provide a method of manufacturing a touch sensor having an excellent adhesion property.

2. Solution to Problem

A touch sensor according to the present invention comprises: a substrate having a transmittance of 5% or less at a wavelength of 380 nm; a touch sensor layer configured to be opposite the substrate and having a thickness of 2 μm to 10 μm; and an adhesive layer disposed between the substrate and the touch sensor layer, wherein the adhesive layer comprises a cured product of an adhesive composition comprising at least one selected from the group consisting of an initiator and a sensitizer having an absorption wavelength ($\lambda_{max}$) in a range of 380 nm to 450 nm and an adhesion strength of 5 N/25 mm or more.

A method of manufacturing a touch sensor according to the present invention comprises: coating a substrate having a transmittance of 5% or less at a wavelength of 380 nm with an adhesive composition comprising at least one selected from the group consisting of an initiator and a sensitizer having an absorption wavelength ($\lambda_{max}$) in a range of 380 nm to 450 nm; providing a touch sensor layer having a thickness of 2 μm to 10 μm such that the touch sensor layer comes in contact with the adhesive composition applied on the substrate; and irradiating a surface of the substrate, which is not in contact with the adhesive composition, with a UV light having a wavelength of 390 nm to 460 nm.

According to the present invention, there is an advantageous effect in that a touch sensor has excellent durability because an adhesion strength between the touch sensor and a substrate can be increased due to an adhesive layer having an excellent adhesion property. Since the touch sensor is directly bonded to a UV poorly-permeating display member or a film, a substrate required for fixing the touch sensor is not necessary, and thus there is an advantageous effect in that the touch sensor can be easily manufactured with a small thickness and has an excellent folding characteristic.

According to a method of manufacturing a touch sensor of the present invention, there is an advantageous effect in that a touch sensor representing an excellent adhesion property and an excellent folding characteristic can be manufactured.

DETAILED DESCRIPTION OF EMBODIMENTS

Figure 1:
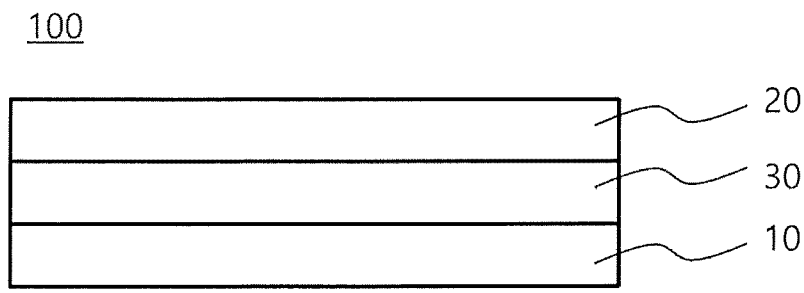
FIG. 1 is a view illustrating an example of a touch sensor according to an embodiment of the present invention.

Hereinafter, the present invention will be described in more detail.

When a member is referred to as being "on" another member in the present invention, the member may be in contact with another member or still another member may exist between the two members.

When a component is referred to as it "includes" another component in the present invention, it is to be understood that the component may further include other elements as well without excluding the other elements unless specifically defined otherwise.

<Touch Sensor>

According to one aspect of the present invention, a touch sensor 100 includes: a substrate 10 having a transmittance of 5% or less at a wavelength of 380 nm; a touch sensor layer 20 configured to be opposite the substrate 10 and having a thickness of 2 μm to 10 μm; and an adhesive layer 30 disposed between the substrate 10 and the touch sensor layer 20, wherein the adhesive layer 30 includes a cured product of an adhesive composition including at least one selected from the group consisting of an initiator and a sensitizer having an absorption wavelength ($\lambda_{max}$) in a range of 380 nm to 450 nm and has an adhesion strength of 5 N/25 mm or more.

In brief, the touch sensor 100 according to the present invention includes the adhesive layer 30 including the cured product of the adhesive composition including at least one selected from the group consisting of the initiator and the sensitizer having an absorption wavelength ($\lambda_{max}$) in the range of 380 nm to 450 nm.

The initiator may be included in order to improve a curing rate by promoting the polymerizability of a (meth)acrylic compound described below.

Specifically, the initiator may be a photoinitiator, such as thioxanthones including thioxanthone, 2-chlorothioxanthone, 2,4-diethylthioxanthone, isopropylthioxanthone and 1-Chloro-4-propoxytioxanthone, 2-methyl-1-(4-(methylthio)phenyl)-2-morpholinopropanone, and 1,2,4,6-trimethylbenzoyl diphenyl phosphine oxide. However, the initiator is not limited to the above and various initiators may be used as long as they satisfy the absorption wavelength.

The content of the initiator may be in the range of 1 to 10 parts by weight, preferably 1 to 5 parts by weight, and more preferably 1 to 3 parts by weight based on 100 parts by weight of the total adhesive composition. When the content of the initiator satisfies the above range, it is possible to produce an adhesive composition having excellent hardness and adhesion properties after curing.

The sensitizer may be included to improve the curing property of the adhesive composition.

The sensitizer may be, for example, a benzophenone compound or a fused ring compound. More specifically, the sensitizer may include a compound selected from the group consisting of an acridone compound, an acridine compound, a coumarin compound, and a thioxanthone compound, but the present invention is not limited thereto and may include a sensitizer satisfying the absorption wavelength.

When the adhesive composition includes an initiator and a sensitizer satisfying the above-described range, the adhesion strength with respect to an adherent can be improved due to near UV (NUV) that passes through the substrate 10 and has a wavelength of 395 nm to 450 nm even when a UV poorly-permeating substrate is used.

The content of the sensitizer may be in the range of 0.1 to 3 parts by weight, preferably 0.1 to 2 parts by weight, and more preferably 0.1 to 1 part by weight based on 100 parts by weight of the total adhesive composition. When the content of the sensitizer satisfies the above range, the adhesion strength with respect to an adherent can be improved.

In one embodiment of the present invention, the adhesive composition may further include at least one selected from the group consisting of an accelerator and a photopolymerizable compound.

The accelerator may be further included to adjust a curing rate of the adhesive composition. The accelerator may be one commonly used in the art. Examples of the accelerator include tertiary amines such as triethylenediamine, benzyldimethylamine, triethanolamine, dimethylaminoethanol and tris(dimethylaminomethyl)phenol; imidazoles such as 2-methylimidazole, 2-phenylimidazole, 2-phenyl-4-methylimidazole, 2-phenyl-4,5-dihydroxymethylimidazole, and 2-phenyl-4-methyl-5-hydroxymethylimidazole; organic phosphines such as tributylphosphine, diphenylphosphine and triphenylphosphine; and tetraphenylboron salts such as tetraphenylphosphonium tetraphenylborate and triphenylphosphine tetraphenylborate. The above elements may be used solely or in combination of two or more, and the present invention is not limited thereto.

The content of the accelerator may be in the range of 0.05 to 3 parts by weight, preferably 0.1 to 1 part by weight, and more preferably 0.1 to 0.5 parts by weight based on 100 parts by weight of the total adhesive composition. When the content of the accelerator is within the above range, the adhesive layer 30 may have excellent adhesion properties and reliability even when exposed in a high-temperature and high-humidity environment.

The adhesive composition may further include the photopolymerizable compound.

The photopolymerizable compound may include at least one selected from the group consisting of a photo-curable oligomer and a photo-curable monomer. The present invention does not limit to the photo-polymerizable compound as long as the photo-polymerizable compound serves as a binder of the adhesive layer 30 which is formed of the adhesive composition after curing.

The photocurable oligomer may include a (meth)acrylate oligomer, but is not limited thereto. In detail, the (meth)acrylate oligomer may include at least one of epoxy (meth)acrylate, urethane (meth)acrylate and polyester (meth)acrylate. For example, urethane (meth)acrylate and polyester (meth)acrylate may be mixed in use or two polyester (meth)acrylates may be mixed in use.

The urethane (meth)acrylate can be prepared by reacting a compound containing a polyfunctional (meth)acrylate having a hydroxyl group in a molecule with a compound having an isocyanate group in the presence of a catalyst according to a method known in the art.

The polyfunctional (meth)acrylate having a hydroxyl group in the molecule may include, for example, 2-hydroxyethyl(meth)acrylate, 2-hydroxyisopropyl(meth)acrylate, 4-hydroxybutyl(meth)acrylate, caprolactone ring-opening hydroxyacrylate, a pentaerythritol tri/tetra(meth)acrylate mixture, and dipentaerythritol penta/hexa(meth)acrylate. The above elements may be used solely or in combination of two or more.

The compound having the isocyanate group may include, for example, 1,4-diisocyanatobutane, 1,6-diisocyanatohexane, 1,8-diisocyanatooctane, 1,12-diisocyanatododecane, 1,5-diisocyanato-2-methylpentane, trimethyl-1,6-diisocyanatohexane, 1,3-bis(isocyanatomethyl)cyclohexane, trans-1,4-cyclohexanediisocyanate, 4,4'-methylenebis(cyclohexylisocyanate), isophoronediisocyanate, toluene-2,4-diisocyanate, toluene-2,6-diisocyanate, xylene-1,4-diisocyanate, tetramethylxylene-1,3-diisocyanate, 1-chloromethyl-2, 4-diisocyanate, 4,4'-methylenebis(2,6-dimethylphenyl isocyanate), 4,4'-oxybis(phenylisocyanate), trifunctional isocyanate derived from hexamethylenediisocyanate, trimethanepropanoladducttoluene diisocyanate, and the like. The above elements may be used solely or in combination of two or more.

The polyester (meth)acrylate can be prepared by reacting polyester polyol with acrylic acid according to a method known in the art. The polyester (meth)acrylate may include, for example, polyester acrylate, polyester diacrylate, polyester tetraacrylate, polyester hexaacrylate, polyester pentaerythritol triacrylate, polyester pentaerythritol tetraacrylate, and polyester pentaerythritol hexaacrylate, and the like. The above elements may be used solely or in combination of two or more.

The photocurable monomer may include, for example, a monomer having an unsaturated group such as a (meth) acryloyl group, a vinyl group, a styryl group, or an allyl group in the molecule as a photocurable functional group without any particular limitation. The photocurable monomer may include a monofunctional or polyfunctional acrylate monomer, a monomer having a (meth)acryloyl group, or the like.

For example, the acrylate monomer may be selected from the group consisting of methacrylate, ethyl acrylate, methyl (meth)acrylate, 2-ethylhexyl(meth)acrylate, butylacrylate, isobutylacrylate, allylmethacrylate, 2-ethoxyethyl(meth) acrylate, isodecyl(meth)acrylate, 2-dodecylthioethylmethacrylate, octylacrylate, isooctylacrylate, 2-methoxyethylacrylate, hydroxyethyl (meth) acrylate, hydroxypropyl (meth)acrylate, hydroxybutyl(meth)acrylate, isooctyl(meth) acrylate, isodecyl(meth)acrylate, stearyl(meth)acrylate, tetrafurfuryl(meth)acrylate, phenoxyethyl(meth)acrylate, octadecylmethacrylate, isobornyl(meth)acrylate, tetrahydrofurylacrylate, and acryloylmorpholine, and the like.

The monomer having the (meth)acryloyl group may include, for example, neopentylglycolacrylate, 1,6-hexanediol(meth)acrylate, propyleneglycoldi(meth)acrylate, triethylene glycoldi(meth)acrylate, dipropylene glycoldi (meth) acrylate, polyethyleneglycoldi(meth)acrylate, polypropyleneglycoldi(meth)acrylate, trimethylolpropanetri (meth)acrylate, trimethylolethane tri(meth)acrylate, 1,2,4-cyclohexanetetra(meth)acrylate, pentaglyceroltri(meth) acrylate, pentaerythritoltetra (meth)acrylate, pentaerythritoltri(meth)acrylate, dipentaerythritoltri(meth) acrylate, pentaerythritol penta(meth)acrylate, dipentaerythritoltetra(meth)acrylate, dipentaerythritolhexa(meth)acrylate, tripentaerythritoltri(meth)acrylate, tripentaerythritolhexa(meth)acrylate, bis(2-hydroxyethyl) isocyanuratedi(meth)acrylate, hydroxyethyl(meth)acrylate, hydroxypropyl(meth)acrylate, hydroxybutyl(meth)acrylate, isooctyl(meth)acrylate, isodecyl(meth)acrylate, stearyl (meth)acrylate, tetrahydrofurfuryl(meth)acrylate, phenoxyethyl(meth)acrylate, isobonol(meth)acrylate, and the like. The above elements may be used solely or in combination of two or more.

The content of the photopolymerizable compound may be in the range of 80 to 98 parts by weight, preferably 80 to 95 parts by weight, and more preferably 90 to 95 parts by weight based on 100 parts by weight of the total adhesive composition.

When the content of the photopolymerizable compound is within the above range, there is an advantageous effect in that the adhesive composition may have an excellent curing property, and thus adhesive and adhesion properties can be improved.

In the present invention, the "substrate" may be provided as a single layer or may have a stack structure of two or more layers. For example, the substrate 10 may include various optical, electronic, and/or radio wave functional films such as a polarizing plate, a composite film in which a film and a liquid crystal are integrated, a display panel, a shielding layer, a barrier layer, and an antenna film. In some embodiments, the substrate 10 may be various input devices and/or sensor members such as a digitizer, a force touch, an IoT sensor or a fingerprint sensor, but the present invention is not limited thereto.

In another embodiment of the present invention, the substrate 10 may be a polarizing plate or a display panel.

In the present invention, the substrate 10 may be a UV poorly-permeating substrate, and the term 'UV poorly-permeating' denotes that a transmittance is 5% or less at a wavelength of 380 nm.

When two or more layers are laminated to form the substrate 10, the transmittance refers to the transmittance of the entire substrate 10.

In the present invention, the structure of the substrate 10 is not particularly limited.

For example, when the substrate 10 is a polarizing plate, the polarizing plate may include a polarizer and a protective film provided on at least one side of the polarizer. The polarizing plate may further include an optical layer such as a hard coating layer, an antireflection layer, an anti-adhesion layer, a retardation film, and a liquid crystal layer in which liquid crystals are aligned.

In other words, the polarizing plate may have the configuration and composition commonly used in the art, and the method of manufacturing the polarizing plate and the polarizer included in the polarizing plate is not particularly limited in the present invention.

For example, the polarizer is one in which a dichroic dye is adsorbed and arranged on a stretched polymer film. A kind of a polymer film constituting the polarizer is not particularly limited as long as the polymer film can be dyed with a dichroic substance such as iodine. In detail, the polymer film may include a hydrophilic polymer film such as a polyvinyl alcohol-based film, an ethylene-vinyl acetate copolymer film, an ethylene-vinyl alcohol copolymer film, a cellulose film, and a film partially saponified with the above films; or a polyene oriented film such as a dehydrated polyvinyl alcohol-based film, a dehydrochlorinated acid-treated polyvinyl alcohol-based film, and the like. Among the above films, the polyvinyl alcohol-based film may be effectively used because the polyvinyl alcohol-based film can enhance uniformity of the degree of polarization in a plane and has excellent dye affinity with respect to a dichroic substance.

The protective film may not be particularly limited as long as the protective film represents excellent properties in terms of transparency, mechanical strength, thermal stability, moisture barrier property, isotropy, and the like.

In detail, the protective film may include a thermoplastic resin such as a polyester resin including polyethyleneterephthalate, polyethyleneisophthalate and polybutyleneterephthalate; a cellulose resin including diacetylcellulose and triacetylcellulose; a polycarbonate resin; an acrylic resin including polymethyl(meth)acrylate and polyethyl(meth)acrylate; a styrene resin including polystyrene and acrylonitrile-styrene copolymer; a polyolefin resin including polyethylene, polypropylene, polyolefin having a cyclo or norbornene-structure, and ethylene propylene copolymer; a vinyl chloride resin; a polyamide resin including nylon and aromatic polyamide; an imide resin; a polyether sulfone type resin; a sulfone resin; a polyether ketone resin: a polyphenylene sulfide resin; a vinyl alcohol resin; a vinylidene chloride resin; a vinyl butyral resin; an allylate resin; a polyoxymethylene resin; an epoxy resin, and the like. In addition, a film composed of a blend of the thermoplastic resin may also be used. Further, a film formed of a thermosetting resin including (meth)acryl, urethane, epoxy, or silicone or a film formed of an ultraviolet curable resin may be used. Among the above elements, a cellulose film having a surface saponified by alkali or the like, for example, a triacetyl cellulose (TAC) film may be effectively used in view of polarization characteristics or durability. In addition, the protective film may have the function of an optical compensation layer.

The display panel may be an organic light emitting diode (OLED) display panel, a liquid crystal display panel, and an electrophoretic display (EPD) panel, but the present invention is not particularly limited to the structure of the display panel.

The touch sensor 100 according to the present invention includes the touch sensor layer 20 having a thickness of 2 μm to 10 μm and configured to be opposite the substrate 10. When the thickness of the touch sensor layer 20 satisfies the above range, the folding characteristic of the touch sensor 100 may be advantageously improved.

As disclosed in Korean Patent Registration No. 10-1401050, the touch sensor layer 20 includes a first sensing pattern for sensing a position of an x-coordinate on a display and a second sensing pattern for sensing a position of a y-coordinate on the display. Upon touch by a person or the like, the x-coordinate and the y-coordinate are transmitted to a control unit (microprocessor) or the like so that a touched position on the display can be detected. The touch sensor may be operated with various methods generally known in the art in addition to the above-described method.

In the present invention, the structure of the touch sensor layer 20 is not limited. For example, the touch sensor layer 20 may include layers commonly used in the art such as an ITO layer, a sensing electrode layer, an insulating layer, a protective layer, and the like.

In another embodiment of the present invention, a protective film may be further provided on the substrate 10, which is not in contact with the adhesive layer 30. In still another embodiment of the present invention, a protective film may be further provided on the touch sensor layer 20 which is not in contact with the adhesive layer 30.

The protective film may have the configuration described above, but the present invention is not limited thereto.

In yet another embodiment of the present invention, at least one selected from the group consisting of a separation layer and a protective layer may be provided between the touch sensor layer 20 and the adhesive layer 30, but the present invention is not limited thereto.

The separation layer may be a polymer organic film and may include, for example, at least one selected from the group consisting of polyimide, poly vinyl alcohol, polyamic acid, polyamide, polyethylene, polystyrene, polynorbornene, phenylmaleimide copolymer, polyazobenzene, polyphenylenephthalamide, polyester, polymethyl methacrylate, polyarylate, cinnamatev polymer, coumarin polymer, phthalimidine polymer, chalcone polymer, and aromatic acetylene polymer.

The separation layer may be finally separated from a separation substrate described below after forming an electrode pattern layer on the separation layer formed on the separation substrate, and the present invention does not limit a separating force, a thickness, and the like of the separation layer.

The protective layer may include at least one of an organic insulating layer and an inorganic insulating layer, and may be formed by a coating and curing method or a vapor deposition method.

A portion where a pad electrode is to be formed may be removed for a circuit connection or the protective layer may be formed except for the portion where the pad electrode is to be formed. In addition, a pad pattern layer may be formed under the pad electrode. The protective layer may be applied over an entire upper surface of the separation layer and patterned to form a pad pattern layer, or the protective layer may be applied over the upper surface of the separation layer except for a portion where the pad pattern layer is to be formed.

The touch sensor 100 according to the present invention may include the adhesive layer 30 having an adhesion strength of 5 N/25 mm or more.

In detail, since the touch sensor 100 according to the present invention is manufactured using an adhesive composition containing at least one selected from the group consisting of an initiator and a sensitizer having an absorption wavelength of 380 nm to 450 nm, there is an advantageous effect in that the adhesion strength may be 5 N/25 mm or more due to the near-ultraviolet wavelength that passes through the substrate 10 even when the substrate 10 has a transmittance of 5% or less at a wavelength of 380 nm.

<Manufacturing Method of Touch Sensor>

In another aspect of the present invention, there is provided a method of manufacturing a touch sensor, the method including: coating a substrate 10 having a transmittance of 5% or less at a wavelength of 380 nm with an adhesive composition including at least one selected from the group consisting of an initiator and a sensitizer having an absorption wavelength in the range of 380 nm to 450 nm; providing a touch sensor layer 20 having a thickness of 2 μm to 10 μm such that the touch sensor layer 20 comes in contact with the adhesive composition applied on the substrate 10; and irradiating a substrate surface, which is not in contact with the adhesive composition, with a UV light having a wavelength of 390 nm to 460 nm.

In detail, the method for manufacturing the touch sensor 100 according to the present invention includes an operation of coating the substrate 10 having the transmittance of 5% or less at the wavelength of 380 nm with the adhesive composition including at least one selected from the group consisting of the initiator and the sensitizer having the absorption wavelength in the range of 380 nm to 450 nm.

The substrate 10, the adhesive composition, the adhesive layer 30, and the touch sensor layer 20 may have configurations described above.

In detail, the substrate 10 may be a polarizing plate or a display panel.

The coating may be performed by a method commonly used in the art, and the present invention is not limited thereto.

For example, the coating method may include a softening method, a Mayer bar coating method, a gravure coating method, a die coating method, a dip coating method, a spray coating method, and the like.

After the adhesive composition has been applied, a touch sensor layer 20 having a thickness of 0.5 µm to 10 µm may be provided in contact with the adhesive composition applied on the substrate 10.

Then, a surface of the substrate 10, which is not in contact with the adhesive composition, is irradiated with a UV light having a wavelength of 390 nm to 460 nm.

When the UV having the above wavelength range is irradiated, the adhesive composition can be easily cured by near-ultraviolet rays that pass through the substrate 10 and have a wavelength of 395 nm to 450 nm so that the adhesion strength of 5 N/25 mm or more can be achieved.

In another embodiment of the present invention, wherein the providing a touch sensor layer 20 to be in contact with the adhesive composition coated on the substrate comprises, transferring the touch sensor layer 20 onto the adhesive composition from a laminate having the touch sensor layer 20 formed on a separation substrate; and delaminating the separation substrate.

The separation substrate is not particularly limited as long as the separation substrate provides a sufficient strength to be fixed without being prone to bending or twisting, and exerts little influence on heat or chemical treatment. For example, glass, quartz, silicon wafer, stainless steel (SUS), or the like can be used.

In detail, the touch sensor layer 20 provided to be in contact with the adhesive composition applied on the substrate 10 may be formed using a touch sensor layer 20 formed on the separation substrate and then delaminating the separation substrate.

The adhesive film may be formed of, for example, a PSA-based adhesive. Further, the adhesive film may be formed using a thermosetting or photo-curing (e.g., UV curable) adhesive. For example, the adhesive film may be formed using a thermosetting or photo-curable adhesive including polyester, polyether, urethane, epoxy, silicone, or acryl.

In general, a touch sensor integrated with a polarizing plate is manufactured by laminating an adhesive layer of a polarizing plate in a state in which a substrate of a touch sensor layer which is bonded to an optical film, plastic, or glass. However, since the touch sensor of the present invention is directly bonded to the polarizing plate or bonded to a part of a conventional display member by a near ultraviolet curable adhesive, the substrate may not necessarily be required. That is, it is possible to manufacture the touch sensor without the separation substrate so that the overall thickness of the separation substrate, such as a film, plastic, or glass, can be reduced.

In addition, the adhesive has a thickness in the range of 0.5 µm to 10 µm, so shallow coating is possible unlike an optical clear adhesive (OCA) or an adhesion agent having a thickness of about 25 µm, which is generally available in the market. Further, since the adhesive is phase-changed from liquid through optical curing, a sufficient adhesion strength may be ensured even when the thickness of the adhesive is small. In addition, since the elastic modulus is higher than that of a general adhesive group, there is an advantageous effect in that the stress generated when the touch sensor layer 20 is folded may be effectively transferred to the bonded substrate 10, and thus the folding characteristic is excellent.

A general UV adhesive is cured by absorbing UVA wavelengths (320 nm to 395 nm) or UVB wavelengths (280 nm to 320 nm), but the polarizing plate transmits UV light with a transmittance of 5% or less at a wavelength of 380 nm, so it is difficult to secure a sufficient amount of light for curing in the polarizing plate upon UV irradiation. In addition, when the touch sensor layer is irradiated with UV light, a shadow region is generated due to a metallic wiring portion of the touch sensor layer, so it is difficult to obtain sufficient curing in the metal wiring portion. However, the touch sensor 100 according to the present invention uses an adhesive composition capable of absorbing a wavelength of NUV (395 nm to 450 nm). Thus, the substrate may be sufficiently cured without non-cured sections when the UV poorly-permeating substrate 10 such as a polarizing plate is irradiated with light so that the high-adhesion configuration having a delamination strength of 5 N/25 mm or more can be obtained.

Further, there is an advantageous effect in that the touch sensor 100 manufactured by the method according to the present invention represents the excellent adhesion strength of 5 N/25 mm or more even when a substrate having a low transmittance is used, specifically, even when the substrate 10 having a transmittance of 5% or less at a wavelength of 380 nm is used.

Hereinafter, the present invention will be described in detail with reference to embodiments. However, the embodiments described in the specification may be modified in various other forms, and the scope of the present specification is not construed as being limited to the above-described embodiments. The embodiments of the present invention are provided to more fully describe the present invention to those skilled in the art. In the following description, "%" and "part" representing the content are based on a weight unless otherwise specified.

Examples 1 to 4 and Comparative Examples 1 and 2: Preparation and Evaluation of Adhesive Composition and Touch Sensor Components were mixed with the composition shown in Table 1 below (unit: parts by weight) to prepare an adhesive composition.

TABLE 1

|  |  |  | Example | | | | Comparative Example | |
|---|---|---|---|---|---|---|---|---|
|  |  |  | 1 | 2 | 3 | 4 | 1 | 2 |
| Photopolymerizable compound [1)] |  | Absorption peak in NUV | 100 | 100 | 100 | 100 | 100 | 100 |
| Photo initiator | TPO[2)] | 395~420 | 3 | — | 1 | — | — | — |
|  | BAPO[3)] | 395~440 | — | 3 | — | — | — | — |
|  | I-907[4)] | ~less than | — | — | 3 | — | 3 | — |

TABLE 1-continued

| | | | Example | | | | Comparative Example | |
|---|---|---|---|---|---|---|---|---|
| | | | 1 | 2 | 3 | 4 | 1 | 2 |
| | I-369[5] | 380 (UVA) 395~400 | — | — | — | 3 | — | — |
| | OXE-01[6] | ~less than 380 (UVA) | — | — | — | — | — | 3 |
| Sensitizer | DEXT-S[7] | 395~425 | 0.5 | — | — | — | — | — |
| | ITX[8] | 395~425 | — | — | 0.5 | — | — | — |
| | EAB-F[9] | 395~430 | — | — | — | 0.5 | — | — |
| Accelerator | Thiol[10] | — | — | — | 0.1 | — | — | — |
| Adhesion strength | N/25 mm | — | 6.55 | 5.95 | 7.56 | 5.16 | 0.01 | 0.01 |
| Foldability (crack resistance) | ○/X | — | ○ | ○ | ○ | ○ | X | X |

[1] Photopolymerizable compound: mixture including 30 parts by weight of 2-ethylhexyl acrylate (EHA), 30 parts by weight of methacrylate (MA), 10 parts by weight of 2-hydroxyethyl acrylate (HEA) and 30 parts by weight of isobornyl acrylate
[2] TPO: 2,4,6-Trimethylbenzoyldiphenylphosphine oxide, BASF company, Darocur TPO
[3] BAPO: Bis-acylphosphine oxide, BASF company, Irgacure 819
[4] I-907: 2-Methyl-1-[4-(methylthio)phenyl]-2-(4-morpholinyl)-1-propanone, BASF company, Irgacure 907
[5] I-369: 2-Benzyl-2-(dimethylamino)-1-[4-(4-morpholinyl)phenyl]-1-butanone, BASF company, Irgacure 369
[6] OXE-01: 1,2-Octanedione, 1-[4-(phenylthio)phenyl]-, 2-(o-benzoyloxime) BASF company Irgacure OXE01
[7] DETX-S: Diethyl thioxanthone, NIPPON KAYAKU, KAYACUREDETX-S
[8] ITX: Isopropyl thioxanthone, Lambson company, Speedcure 2-ITX
[9] EAB-F: Diethylamino benzophenone, Hodogaya company, EAB-F
[10] Thiol: Pentaerythritol tetrakis (3-mercaptobutylate), Showa denko company, KarenzMT™ PE1

Figure 2:
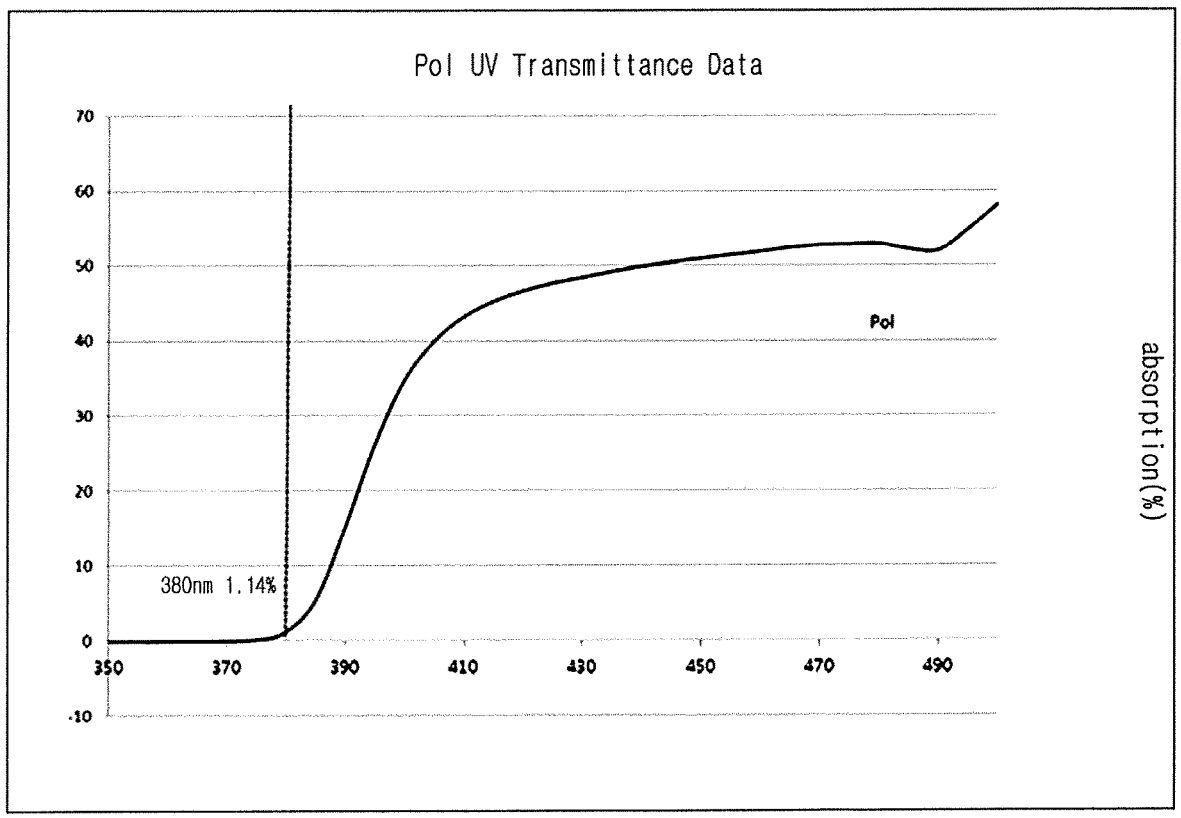
FIG. 2 is a graph illustrating transmittances of a polarizing plate according to Example and Comparative Example.

The adhesive composition prepared in Examples and Comparative Examples was applied to one surface of a touch sensor having a thickness of 8 μm and an adhesive layer was formed thereon to have a thickness of 2.1 μm. Then, a UV-opaque polarizing plate (a thin polarizing plate in which cellulose-based protective films were laminated on both sides of a polyvinyl alcohol polarizer) was laminated and then cured with light quantity of 1200 mJ/cm² using a high-pressure mercury lamp, thereby manufacturing a touch sensor. The transmittance of the polarizing plate was measured using a UV-2450 instrument manufactured by Shimadzu Corporation, and the result is shown in FIG. 2.

The physical properties of the manufactured touch sensor were measured by a method described below, and the results are shown in Table 1 above.

(1) Adhesion Strength

An adhesive layer having a composition prepared in Examples and Comparative Examples was formed between an upper polarizing plate and a lower touch sensor layer to have a thickness of 2.1 μm, and then an upper surface of the upper polarizing plate was irradiated with a light having an amount of 1200 mJ/cm², thereby curing the adhesive. Then, 610 Tape of 3M was bonded, with a 2 Kgf Roll, to an upper surface of the touch sensor layer of a specimen which had been cured, and then the specimen was cut into a piece having a length of 120 mm and a width of 25 mm for inspecting the adhesion strength. The adhesion strength (N/25 mm) was measured by delaminating the bonded 610 Tape of 3M at a rate of 300 mm/min in the delamination direction of 90 degrees.

When the delamination force at the upper surface of the Tape/touch sensor layer was less than or equal to the delamination force at the touch sensor layer/polarizing plate, the surface of the Tape/touch sensor layer was delaminated and it was determined that the delamination force of the touch sensor layer/polarizing plate was greater than or equal to the measured value. When the delamination force at the upper surface of the Tape/touch sensor layer was greater than the delamination force of the touch sensor layer/polarizing plate, an interface between the touch sensor layer and the polarizing plate was delaminated and the measured value was determined as the delamination force. A laminated thin polarizing plate, in which cellulose protective films were laminated on both sides of a polyvinyl alcohol polarizer, was used as the polarizing plate and the polarizing plate was prepared with reference to Korean Unexamined Patent Publication Nos. 2010-0114388 and 2016-0142546.

(2) Evaluation of Folding Resistance (Crack Resistance)

A specimen was prepared by cutting the touch sensor according to Examples and Comparative Examples into a size of 1 cm×10 cm, and a bending test with a radius of curvature of 3 mm was performed 100,000 times. Then, the transparent laminate was visually observed for inspecting cracks. The evaluation criteria were as follows.

O: Crack was not observed over a whole area of a specimen, no-crack.

X: Crack was propagated over a whole area of the specimen, crack generation.

What is claimed is:

1. A touch sensor comprising:
   a substrate having a transmittance of 5% or less at a wavelength of 380 nm;
   a touch sensor layer configured to be opposite the substrate and having a thickness of 2 μm to 10 μm; and
   an adhesive layer having low ultraviolet transmittance, disposed between the substrate and the touch sensor layer,
   wherein the adhesive layer comprises a cured product of an adhesive composition having an adhesion strength of 5N/25 mm or more and comprising an initiator and a sensitizer having an absorption wavelength ($\lambda_{max}$) in a range of 380 nm to 450 nm, and wherein the content of the sensitizer is in the range of 0.1 to 3 parts by weight based on 100 parts by weight of the total adhesive composition.

2. The touch sensor according to claim 1, wherein the adhesive composition further comprises at least one selected from the group consisting of an accelerator and a photopolymerizable compound.

3. The touch sensor according to claim 1, further comprising a protective film formed on the substrate which is not in contact with the adhesive layer.

4. The touch sensor according to claim 1, further comprising a protective film formed on the touch sensor layer which is not in contact with the adhesive layer.

5. The touch sensor according to claim 1, wherein the substrate is a polarizing plate or a display panel.

6. The touch sensor according to claim 1, further comprising at least one selected from the group consisting of a separation layer and a protective layer between the touch sensor layer and the adhesive layer.

7. The touch sensor according to claim 1, wherein the sensitizer comprises at least one selected from the group consisting of benzophenones and thioxanthones.

8. A method of manufacturing a touch sensor, the method comprising:

coating a substrate having a transmittance of 5% or less at a wavelength of 380 nm with an adhesive composition having low ultraviolet transmittance and having an adhesion strength of 5N/25 mm or more and comprising an initiator and a sensitizer having an absorption wavelength ($\lambda_{max}$) in a range of 380 nm to 450 nm wherein the content of the sensitizer is in the range of 0.1 to 3 parts by weight based on 100 parts by weight of the total adhesive composition;

providing a touch sensor layer having a thickness of 2 μm to 10 μm to be in contact with the adhesive composition coated on the substrate; and irradiating a surface of the substrate, which is not in contact with the adhesive composition, with a UV light having a wavelength of 390 nm to 460 nm.

9. The method according to claim 8, wherein the providing a touch sensor layer to be in contact with the adhesive composition coated on the substrate comprises:

transferring the touch sensor layer onto the adhesive composition from a laminate having the touch sensor layer formed on a separation substrate; and delaminating the separation substrate.

10. The method of claim 8, wherein the sensitizer comprises at least one selected from the group consisting of benzophenones and thioxanthones.

* * * * *